No. 661,423. Patented Nov. 6, 1900.
A. F. PETERSON.
PULVERIZER.
(Application filed July 9, 1900.)
(No Model.)
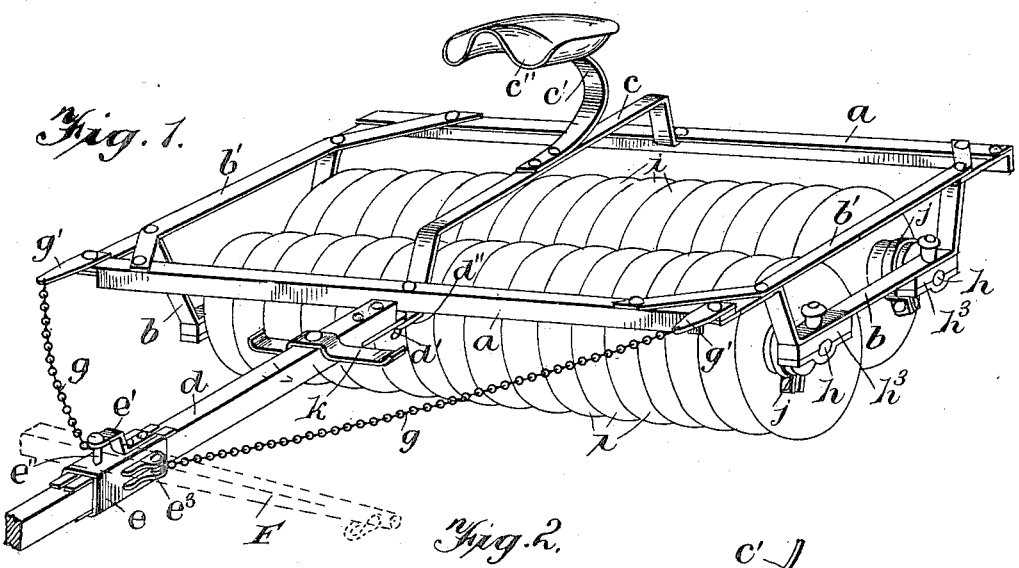
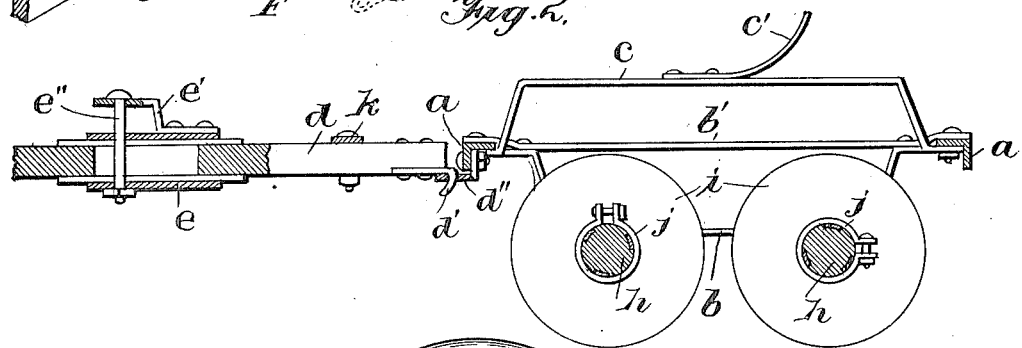
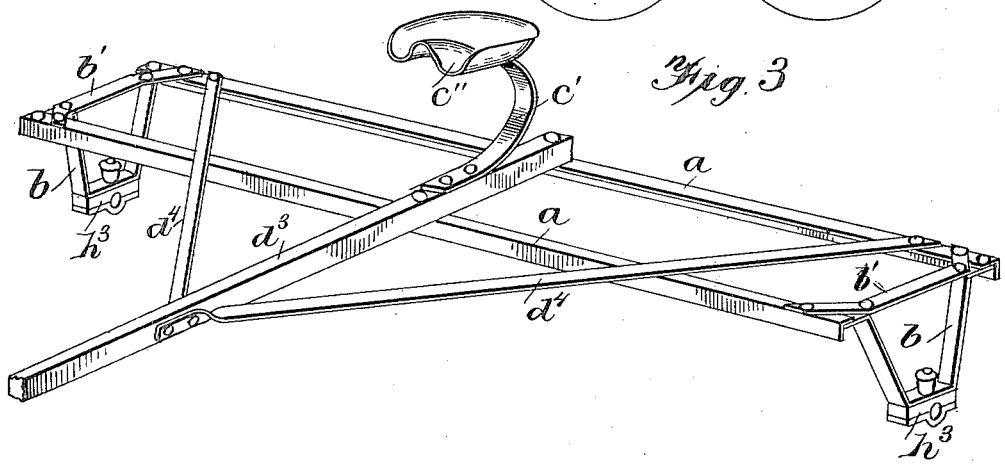
Witnesses
Geo. E. Fuch.
Emily R. Peck.
Inventor
A. F. Peterson
By Hubert E. Peck
Attorney

UNITED STATES PATENT OFFICE.

AUGUST F. PETERSON, OF KENT, OHIO.

PULVERIZER.

SPECIFICATION forming part of Letters Patent No. 661,423, dated November 6, 1900.

Original application filed February 13, 1900, Serial No. 5,092. Divided and this application filed July 9, 1900. Serial No. 23,011. (No model.)

*To all whom it may concern:*

Be it known that I, AUGUST F. PETERSON, a citizen of the United States, residing at Kent, Portage county, State of Ohio, have invented certain new and useful Improvements in Pulverizers; and I do hereby declare the following to be a full, clear, and exact description of the invention, such as will enable others skilled in the art to which it appertains to make and use the same.

This invention relates to agricultural implements, and more particularly to certain improvements in soil-pulverizers, and this application is a division of my parent case filed February 13, 1900, Serial No. 5,092.

One object of my invention is to provide a pulverizer or like soil crushing or harrowing implement with an exceedingly strong and durable framework economical in construction and composed of a minimum number of parts.

Another object of my invention is to provide a strong and durable frame for a pulverizer or other like soil crushing or harrowing implement with simple improved draft attachments whereby the draft on the frame is not applied through the guiding-tongue, but is applied directly to the frame from a sliding box mounted on the tongue.

Other objects and the nature of my invention will be obvious to those skilled in the art from the following description of the example shown in the accompanying drawings of constructions among others within the spirit and scope of my invention.

My invention consists in certain novel features in construction and in combination and arrangements of parts and details, as more fully and particularly pointed out and specified hereinafter.

Referring to the accompanying drawings, Figure 1 is the perspective of an implement constructed in accordance with my invention, the draft tongue or pole being broken away and the doubletree shown by dotted lines. Fig. 2 is a partial longitudinal sectional view of the machine. Fig. 3 is a perspective view of a framework for a single-shaft implement within the spirit and scope of my invention.

In the drawings, $a$ $a$ are the upper parallel cross frame-bars, and $b$ $b$ the centrally-depressed end yokes, connections, or bars rigidly connecting the long cross-bars $a$ $a$ and constituting the generally rectangular frame of the machine. The long front and rear cross-bars $a$ $a$ are preferably (although not necessarily) constructed of angle-iron bars arranged with the top horizontal flange or web and the vertical depending flange or web. The frame ends are formed by strong usually flat metal bars at their ends rigidly bolted or otherwise secured to the ends of said front and rear cross-bars. These end bars or pieces are centrally depressed — that is, each end piece has the horizontal depressed straight intermediate portion about in the horizontal plane of the axes of the several series of cutting-disks with the upwardly-inclined ends having the straight horizontal extremities fitting and secured to the ends of the cross-bars, as previously described.

The frame ends are trussed or braced by the metal strap, plates, or bars $b'$ $b'$, arranged approximately in the same horizontal plane as the long cross-bars $a$ $a$, and said straps span the spaces between the upper ends of said frames or yokes $b$ $b$ and are arranged approximately in the same vertical planes with said ends, respectively. Each brace or truss strap is preferably secured to the upper ends of its bar $b$ and has its ends deflected and secured to the front and rear cross-bars, respectively, about as shown, thereby bracing and strengthening the corners of the frame of the machine, as well as bracing or trussing the depressed end bars. A frame of great strength is thus provided for the machine, although the frame is exceedingly light and durable.

$c$ is an arched seat-support and rigid frame-brace consisting of a metal bar arranged centrally of the machine or implement and having the downwardly-inclined ends rigidly secured to the front and rear cross bars, so that the straight intermediate portion of the bar is elevated the desired distance above the plane of the cross-bars $a$ $a$ of the frame.

$c'$ is the seat-spring secured on the bar or support $c$ and carrying the driver's seat $c''$. This bar or seat-support forms an additional brace for the machine-frame and increases the stiffness and strength thereof, although my invention is not limited to the employment of such bar or support c, nor to any particular arrangement of seat-support, nor, in fact, to the employment of a rider's seat, although when it is desired to employ such advantages are attained by the construction just described.

d is the pole or tongue to which the draft-animals are attached. This is usually composed of a rigid stick or bar and extends forwardly from the center of the front cross-bar and at its rear end is suitably coupled to said cross-bar, preferably in the line or vertical plane of said seat-support or bar c. The tongue can be attached in any suitable manner, as by a rigid hook or projection d', rigid with and depending from the end of the tongue and usually passing loosely through an opening in a rigid projection d", extending forwardly from said frame-bar and on which the rear end of the tongue rests. If desired, the front end of the seat-support c, which forms a connecting-bar, can be extended around under the front bar a and forwardly to form the rest d" just mentioned for the rear end of the tongue. However, I do not wish to limit my invention to such an arrangement, although I consider it a valuable feature for certain purposes.

I have found it advantageous to utilize the tongue for guiding or directing the machine and to provide mechanism for applying or attaching the draft to the machine other than through the coupling between the rear end of the tongue and the main frame. As one example of what might be employed for this purpose within the spirit and scope of my invention I show a box or slide movable longitudinally of the tongue and to which the draft is attached and through the medium of which the draft is applied to the implement-frame independently of the attachment of the tongue to said frame. In the drawings the slide is composed of a metal box or casing e, loosely surrounding the tongue and slidable longitudinally thereon. If desirable, the box can slide on metal facings or wear-plates secured to the tongue. The doubletree F is pivotally joined to this box e in any suitable manner. For instance, I show the rigid brace e' projecting above the top face of the box to extend above the doubletree, which rests thereunder on the top face of the box and swings on the movable pivot bolt or pin e", passing through the brace and doubletree into the box.

The two side faces of the box are shown formed with the outside lateral perforated ears or lugs $e^3$, by means of which suitable draft connections, such as chains g g, are detachably coupled at their front ends to said box. The chains can be coupled to said box by pins or bolts passing vertically through each pair of lugs or ears $e^3$ and through a chain-link inserted between said ears. The said draft connections g g preferably extend rearwardly from opposite sides of the box to the outer front corners of the main frame, respectively. The front corners of the main frame are preferably provided with forwardly-projecting perforated ears g' g', to which said chains can be coupled in any suitable manner, as by hooks, substantially as shown.

From the foregoing description it is obvious that the lengths of the chains between the slidable box and the frame of the implement can be varied or adjusted. By employing such arrangement for the application of the draft the doubletree can move back and forth on the pole with the slide, and as the draft is not on the pole and through the same to the implement the implement is prevented from wabbling or shifting from side to side, but moves straight ahead with the draft-animals. The pulverizing or harrowing element of the implement is made up of a series of oppositely-beveled disks having circular cutting edges. The disks i are loosely mounted closely together on one or more shafts h, having end journals mounted in journal-boxes on the frame ends. In the preferred form I employ two parallel series of cutting-disks arranged one in advance of the other with the disks of one series arranged opposite the spaces between the disks of the other series, so that said disks do not "track."

The end journals of the shafts h h are usually located under the depressed ends of the frame and are mounted in separable journal-boxes $h^3$, secured to and preferably depending from the under sides of said frame ends. Oil-passages can be formed down through the frame ends into said boxes to supply a suitable lubricant to the journals, and oil-cups can be mounted, as shown, at the upper faces of said frame ends. These disks are arranged closely together on their respective shafts and between the ends of the frame of the implement. Each disk is free to turn independently of the remaining disks and of the shaft. Hence in turning the implement the shafts remain stationary and the disks on one portion of a shaft revolve forwardly and those on the opposite portion backwardly, and the disks can turn at different rates of speed. When the implement is moving straight ahead and under ordinary operating conditions, the disks and their respective shafts rotate together as though the disks were rigid on the shafts. Suitable means are provided to maintain the disks on the shafts and yet permit easy removal for repair and also to permit adjustment of the disks longitudinally of a shaft and toward and from each other. The shafts can be easily removed from their journal-boxes, and by providing such means as just mentioned the disks can be removed from or replaced on a shaft and the number of disks reduced or increased within the capacity of the shaft. For instance, I show metal clamps j on the ends of each wooden shaft between the frame ends and the end disks on the shaft.

k is a metal cross-piece secured on the rear portion of the tongue and projecting beyond the side faces thereof to form foot-rests for the driver occupying the seat before described. This machine not only performs the functions of a pulverizer, but also that of a roller, as it will pulverize the hardest clods and lumps and also so press down the earth as to form a solid seed-bed where the plants root and yet leave the soil loose at the surface for the free upward passage of the plant-shoots. This machine pulverizes, harrows, and rolls in the one operation.

I do not wish to limit my invention to an implement embodying all features hereinbefore set forth, and my invention involves the employment of one or more series of disks. For instance, in Fig. 4 I show the framework for an implement provided with a single shaft and series of cutting-disks. I also show the tongue $d^3$ crossing and resting on and secured to the front and rear frame-bars and carrying the seat-spring $c'$ and seat $c'$. Also instead of the chains $g$ attached to a slide I can secure rearwardly-extending connections $d^4$ $d^4$ rigidly to the tongue and diverge the same rearwardly and secure them rigidly to the front and rear frame-bars, and thereby form a most strong, rigid, and durable structure which can be very economically manufactured.

It is evident that various changes might be made and modifications resorted to in the forms, constructions, and arrangements of the parts described without departing from the spirit and scope of my invention. Hence I do not wish to limit myself to the exact construction shown.

Having thus fully described my invention, what I claim as new, and desire to secure by Letters Patent of the United States, is—

1. In a pulverizer, the combination of the parallel angle-iron front and rear frame-bars, a tongue extending forwardly and centrally of said bars, rearwardly extending and diverging connections from said tongue secured to the front bar, the centrally-depressed flat metal end bars having the straight ends secured to the ends of said angle-iron frame-bars, the truss-straps secured to and connecting said straight ends of said end bars, respectively, and also secured to said angle-iron bars, and a shaft mounted to the lower portions of said end bars and provided with soil-rolling devices, substantially as described.

2. In a pulverizer, the combination of front and rear frame-bars, draft devices, the end bars rigidly secured to and connecting the frame-bars and having the centrally-depressed portions and straight ends, and the truss-straps secured to said flat ends of the end bars, respectively, and also secured to the front and rear frame-bars and bracing the corners of the frame formed by the front and rear and end bars, substantially as described.

3. In a pulverizer, the combination of a frame comprising front rear and end bars rigidly secured together at their ends, and the truss-straps rigidly secured to and connecting end portions of the end bars, respectively, and having the deflected diagonal ends secured to the front and rear bars and bracing the corners of the frame, substantially as described.

4. In a pulverizer, the combination of the parallel front and rear cross-bars, the end bars rigidly secured to and connecting said cross-bars and depressed between the same, the truss-straps secured to the upper portions of the end bars, respectively, and secured to the cross-bars and bracing the corners of the frame, draft connections, and a shaft carrying a series of disks, substantially as described.

5. In a pulverizer, the combination of a rigid frame, a draft-tongue, a box-slide confined thereto, and movable longitudinally thereon, said slide having a brace and pivot-bolt for the doubletree, and provided with side bars, the front corners of the frame having side ears, and loose draft connections from said ears of the slide to the ears of the frame, substantially as described.

6. In a pulverizer, the combination of the rectangular frame comprising the parallel front and rear bars and the connecting depressed end bars, a rotary shaft carried by the end bars, rotary disks in said shaft, the tongue coupled to the central portion of the front frame-bar, a box slidable longitudinally on the tongue and provided with means for coupling the draft thereto, and draft connections from said box to the front corners of said main frame, substantially as described.

7. In a device of the character described, the combination of a horizontally-disposed main frame, rolling soil-pulverizing means mounted therein, the rigid arched cross-bar arranged centrally of said frame in the line of draft and rigidly secured to the front and rear bars thereof, the tongue arranged in the plane of said cross-bar, an eye fixed to said frame, a projection rigid with the rear end of the tongue and entering said eye and loosely coupling said tongue to said frame, a seat mounted on said cross-bar, the foot-piece rigid with and projecting laterally from said tongue, and a draft device movable longitudinally on the tongue and having the direct-draft connections therefrom to the front corners of said main frame, whereby the draft is applied to the main frame through said draft device and its said connections, substantially as described.

8. In a machine of the character specified, the combination of a main frame, soil-pulverizing means mounted therein, a tongue coupled to said frame, a longitudinal slot through said tongue, a box loosely encircling the tongue, a bolt secured to the box and passing loosely through said slot, and draft connections from said box to the main frame on opposite sides of the tongue, said box adapted to have the draft coupled thereto, for the purpose substantially as described.

9. In a pulverizer, the combination of a horizontal main frame, soil-pulverizing means mounted therein, a tongue loosely coupled thereto, ears at the front end portions of said frame, a box loosely embracing the tongue and slidable longitudinally thereon and provided with a bolt to receive the draft, said box having side attaching-ears, the draft connections attached to said ears of the frame, respectively, and means adjustably securing said connections to the ears of the box, respectively, substantially as described.

10. In combination, a horizontal main frame comprising end pieces and front and rear bars, soil-pulverizing means mounted in said frame, a forwardly-projecting eye rigid with the central portion of said front bar, a tongue resting on said eye and having a rigid depending projection entering the same, a box loosely embracing and longitudinally movable on said tongue and provided with means to receive draft-attaching devices, and draft connections attached to said box and attached to opposite end portions of said front bar respectively, substantially as described.

11. In a pulverizer, the combination of a frame, soil-pulverizing means mounted in the frame, a tongue loosely coupled to the frame having a longitudinal slot therethrough, a box loosely embracing the tongue and longitudinally movable thereon, a bolt secured to the box and passing through said slot and extended beyond the box to receive the draft-attaching devices, said box having side ears, and draft connections attached to said ears of the box and to the front end portions of said frame, substantially as described.

In testimony whereof I affix my signature in presence of two witnesses.

AUGUST F. PETERSON.

Witnesses:
W. W. PATTON,
O. S. ROCKWELL.